United States Patent
Ahlgren et al.

(12)

(10) Patent No.: US 6,387,998 B1
(45) Date of Patent: May 14, 2002

(54) PROCESS FOR PREPARING A CATIONICALLY MODIFIED (METH)ACRYLAMIDE POLYMER AND USE OF THE POLYMER

(75) Inventors: Jonni Ahlgren; Lars Petander; Jussi Nikkarinen, all of Vaasa (FI)

(73) Assignee: Kemira Chemicals Oy, Helsinki (FI)

( * ) Notice: Subject to any disclaimer, the term of this patent is extended or adjusted under 35 U.S.C. 154(b) by 0 days.

(21) Appl. No.: 09/529,627
(22) PCT Filed: Oct. 29, 1998
(86) PCT No.: PCT/FI98/00840
§ 371 Date: Apr. 13, 2000
§ 102(e) Date: Apr. 13, 2000
(87) PCT Pub. No.: WO99/21822
PCT Pub. Date: May 6, 1999

(30) Foreign Application Priority Data

Oct. 29, 1997 (FI) .................................................. 974090

(51) Int. Cl.$^7$ ........................... C07C 221/00; C02F 1/56
(52) U.S. Cl. ........................................ 524/510
(58) Field of Search ........................... 524/510

(56) References Cited

U.S. PATENT DOCUMENTS

| 2,328,901 A | 9/1943 | Grimm et al. |
|---|---|---|
| 3,367,918 A | 2/1968 | Lesinski et al. |
| 4,010,131 A | 3/1977 | Phillips et al. |
| 4,013,606 A | 3/1977 | Ballweber et al. |
| 4,166,828 A | 9/1979 | McDonald |
| 4,179,424 A | 12/1979 | Phillips et al. |
| 4,288,390 A | 9/1981 | McDonald ............... 564/204 |
| 4,297,256 A | 10/1981 | McDonald |
| 4,789,695 A | 12/1988 | Farrar et al. ............ 523/336 |
| 5,091,584 A | 2/1992 | Brake .................... 564/471 |

FOREIGN PATENT DOCUMENTS

| EP | 0 031 928 | 7/1981 |
|---|---|---|
| FI | 62846 | 3/1983 |

*Primary Examiner*—Nathan M. Nutter
(74) *Attorney, Agent, or Firm*—Greenberg Traurig, LLP; Joseph M. Manak; Eugene C. Rzucidlo

(57) ABSTRACT

The invention relates to a process for preparing a cationically modified (meth)acrylamide polymer by the Mannich reaction. There is prepared in advance a stable aldehyde-secondary amine adduct, which is obtained as a reaction product of an aqueous solution of the secondary amine and an aqueous solution of the aldehyde, and which, after the formation of the adduct, is stabilized to endure storage, by lowering the pH of the mixture of 7 or below and/or by adding methanol, and the adduct thus prepared is added to an aqueous solution of the (meth)acrylamide polymer and the pH is adjusted to an alkaline level, whereupon modification occurs. The invention also relates to the use of the modified (meth)acrylamide polymer as a flocculation, retention or dewatering agent.

16 Claims, No Drawings

PROCESS FOR PREPARING A CATIONICALLY MODIFIED (METH)ACRYLAMIDE POLYMER AND USE OF THE POLYMER

FIELD OF THE INVENTION

The invention relates to the preparation of a cationically modified (meth)acrylamide polymer by the Mannich reaction. The invention additionally relates to the use of the polymer as a flocculation, retention and dewatering agent.

BACKGROUND

A known process for preparing cationic polymers of a high molecular weight is to modify copolymers of poly (meth)acrylamide or (meth)acrylamide by the Mannich reaction, wherein the modification is carried out using a secondary amine and an aldehyde, typically formaldehyde, or reaction products of these. When the Mannich reaction is used in the preparation of cationic polymers, the modification is often carried out in an aqueous solution of the polymer. For example, the polymers needed in the treatment of waste waters are polymers of a very high molecular weight, and therefore the treatment must be carried out in very dilute aqueous solutions, typically less than five per cent aqueous solutions. The transport of dilute solutions over long distances is uneconomical, and additionally Mannich-treated (meth)acrylamide polymer solutions are known to be unstable, which is observable as an increase of viscosity with time.

Means of avoiding the transportation of dilute solutions include carrying out the Mannich treatment so that the (meth)acrylamide polymer is in the form of an aqueous solution emulsified in a water-insoluble solvent by means of surface active agents. The other treatment chemicals are then added to this emulsion, which may be more concentrated than the polymer solution, typically 10–40%. Thus the transportation of a dilute polymer solution to the point of use of the cationic polymer can be avoided. At the point of use, water is added to the emulsion, whereupon the polymer in the emulsion will dissolve. However, the method has the disadvantage that it is difficult to separate the solvents and surface active agents present in the emulsion from the solution to be used, and thus they will pass to the target of use in the solution, thus causing process problems and environmental problems.

The disadvantages of the solvents and surface active agents present in the emulsion polymer can be avoided only by using aqueous solutions. However, in order to avoid the transportation of dilute solutions to the point of use, it is preferable to transport the components needed in the reaction to the point of use of the cationic polymer and to carry out the Mannich treatment there.

The simplest method is first to dissolve the required (meth)acrylamide polymer in water and then to add the secondary amine and the formaldehyde at a suitable temperature, and to allow the reaction mixture to react for a suitable time. This has the disadvantage that two different chemicals are required for the modification of the polymer. Furthermore, the formaldehyde and the amines used, such as dimethylamine, are substances difficult to handle, causing, for example, odor problems and a risk of ignition. In addition, it is often necessary to carry out the treatment in a separate container, to which the dissolved polymer must be transferred for the treatment. This increases the treatment time and the number of treatment steps.

In CA patent publication 1 031 096 (G. Sackman et al.), an attempt is made to solve the problems of handling difficult chemicals by using amines which boil at higher temperatures than do simple dialkylamines. However, such amines are less reactive and less economical to use than simpler dialkylamines.

FI patent publication 62846 (Nalco Chemical Co.) proposes as a solution to the problem the Mannich reaction as a continuous process treatment by means of which it is possible to avoid unnecessary transfers between the polymer dissolution apparatus and the treatment vessel. However, the problem of handling two difficult chemicals is not avoided.

The handling of difficult chemicals can be avoided by using the mixture disclosed in U.S. Pat. No. 3,367,918 (The Dow Chemical Co.), which contains, mixed, all the components required in the Mannich treatment, such as a solid salt of a secondary amine, paraformaldehyde as a formaldehyde-producing substance, a solid polyacrylamide, and sodium carbonate as a component which raises the pH. When the mixture is dissolved in water, the Mannich reaction occurs. However, amine salts and solid high-boiling secondary amines are highly hygroscopic. In mixtures with polyacrylamide, their hygroscopicity causes adhesion of the particles in the mixture, a factor which makes the mixed powders difficult to handle.

The separate handling of secondary amine and formaldehyde is avoided if the Mannich treatment is carried out using their reaction product, dialkylaminomethanol, the handling of which is not as difficult as that of secondary amines and formaldehyde. Furthermore, the use of the reaction product reduces the number of the chemicals required for the Mannich treatment from two to one. The preparation of such a reaction product and its use together with acrylamide polymers is described in, for example, U.S. Pat. No. 2,328,901 (Grimm et al.), U.S. Pat. No. 4,010,131 (Philips et al.), U.S. Pat. No. 4,166,828 (McDonald) and U.S. Pat. No. 4,288,390 (McDonald). However, in EP patent 210 784 (Farrar et al.) it is noted that such a reaction product is unstable, for which reason it cannot be stored for long periods of time. During storage the reactivity of the reaction product is at the same time lowered.

SUMMARY OF THE INVENTION

As a result of the present invention, a process has now been achieved by which the stability of the reaction product of a secondary amine and an aldehyde can be improved significantly. The process also provides the further advantage that the cation exchange capacity of a cationically modified (meth)acrylamide polymer can easily be adjusted; this need for modifying the cation exchange capacity is very necessary in particular at waste water treatment plants.

The invention is based on the fact that it is possible to prepare in advance an aldehyde-secondary amine adduct the stability and reactivity of which remain for quite a long period. Thus the handling of two difficult chemicals is avoided, and at the same time the number of work steps is reduced and it is possible to prepare a cationic (meth) acrylamide polymer suited specifically for a given treatment plant.

DETAILED DESCRIPTION OF THE INVENTION

In accordance with the present invention, an aldehyde-secondary amine adduct prepared in advance is obtained by mixing an aqueous solution of a secondary amine with an aqueous solution of an aldehyde. The aldehyde may be formaldehyde, paraformaldehyde or 1,3,5-trioxane, preferably formaldehyde. The secondary amine may be any dialkylamine, the alkyl carbon chain of which may have 1–5 carbon atoms, the most preferable being dimethylamine. The mixing ratio of the aldehyde to the secondary amine may vary within the range 2:1–1:2. The reaction temperature may vary from room temperature to very high temperatures, depending on how rapid an adduct formation is desired. The formed aldehyde-amine adduct is stabilized to increase shelf life and resistance to reactions by adjusting the pH to 7 or below or by adding methanol to the mixture, or most preferably my adjusting the pH to 7 or below and by adding methanol. The adjustment of the pH may be carried out using either an organic or an inorganic acid, preferably hydrochloric acid, sulfric acid or oxalic acid. The adduct thus stabilized can be transported ready-made to the point of use, where the actual cationic modification of the (meth) acrylamide polymer is carried out to the desired degree of cation exchange capacity.

It is recommended that at the point of use the actual modification of the (meth)acrylamide polymer is carried out in a polymer dissolution apparatus. The adduct solution is added to the dissolution apparatus after the dissolution of the polymer or already during the dissolving. The reaction will progress to some degree at any pH, but in order to accelerate the reaction the pH of the polymer-adduct solution is adjusted to a sufficiently high value, typically above 9, with the necessary amount of an alkali, typically an alkali metal hydroxide or an alkali metal carbonate. The alkali is preferably sodium hydroxide, sodium carbonate, potassium hydroxide or potassium carbonate. The alkali may be added to the solution at the same time as the polymer or separately. The treatment may be carried out at various temperatures, typically at 20–80° C. At a higher temperature the reaction time is shortened, being 10–15 hours at 20° C., 2–5 hours at 40° C., and 0.5–1 hour at 60° C. Preferably polymer is dissolved in hot water in the dissolution apparatus in order that a temperature higher than room temperature should at the same time be obtained for the reaction.

The polymer used in the treatment may be polyacrylamide or polymethacrylamide, or a copolymer of acrylamide or methacrylamide with one or more monomers. Preferably the polymer is polyacrylamide or a copolymer of acrylamide with a cationic monomer. The polymer may be immediately soluble in water, or may become water-soluble only along with the treatment. The molecular weight of the polymer should in general be very high, typically above 100,000. For this reason the concentration of the polymer solution treated is low, typically below 5%, preferably below 1%. The degree of treatment, i.e. the molar ratio of the reacting amine groups and polymer amide groups used, may vary within the range 0.01–1.

The cationic polymer obtained from the treatment may be used, as can other cationic polymers, for example as a flocculant in the settling of colloidal fines, as a retention agent in paper making, for the dewatering of slurry in the treatment of waste waters, and as a filtration aid.

The invention is described with the help of the following examples, the purpose of which is not to limit the scope of the invention.

EXAMPLE 1

100 g of a 37 wt. % formaldehyde and 138.9 g of a 40 wt. % dimethylamine are mixed together. 7 g of methanol is added. This is called reaction product A.

100 g of a 37 wt. % formaldehyde and 138.9 g of a 40 wt. % dimethylamine are mixed together. 118.3 g of a 32 wt. % hydrochloric acid is added (pH of the mixture 7). This is called reaction product B.

100 of a 37 wt. % formaldehyde and 138.9 g of a 40 wt. % dimethylamine are mixed together. 31.6 g of methanol and 118.6 g of a 32 wt. % hydrochloric acid is added (pH of the mixture 7). This is called reaction product C.

Mannich treatments are performed using reaction products A, B and C by adding the reaction products in an amount indicated in Table 1 to 150 g of a 1 wt. % polyacrylamide solution (viscosity of the polymer in a 2 wt. % solution 700 mPas 25° C.). The pH of the solution is adjusted to 10 by using a 12 wt. % sodium hydroxide solution. The mixture is allowed to react for 5 hours at 40° C.

Mannich treatments are performed at different times. The cation exchange capacities of the solutions are measured. The results shown in Table 2 are obtained.

TABLE 1

| | Reaction product A | Reaction product B | Reaction product C |
|---|---|---|---|
| Dose in the treatment, g | 3.2 | 4.6 | 5.8 |
| Degree of treatment (= molar ratio of the amine used to the amide groups in the polymer) | 0.75 | 0.75 | 0.87 |

TABLE 2

(Values indicate cation exchange capacity, meq/g)

| Time from the making of the reaction product, d | Reaction product A | Reaction product B | Reaction product C | Reaction product A | Reaction product B | Reaction product C |
|---|---|---|---|---|---|---|
| | pH 4 | pH 4 | pH 4 | pH 7 | pH 7 | pH 7 |
| 0 | | 0.07 | 0.07 | | 0.06 | 0.06 |
| 2 | | 0.07 | 0.07 | | 0.06 | 0.06 |
| 5 | 0.07 | 0.06 | 0.07 | 0.06 | 0.05 | 0.06 |
| 7 | 0.06 | 0.06 | 0.07 | 0.06 | 0.06 | 0.06 |
| 14 | 0.06 | 0.06 | 0.07 | 0.05 | 0.05 | 0.06 |
| 21 | 0.05 | 0.06 | 0.06 | 0.05 | 0.05 | 0.06 |

The example shows that methanol and a lowering of the pH each even alone stabilizes the reaction product, but the stabilization is most effective when they are used together.

The following example describes how the reaction mixture ages when stabilization is not used.

EXAMPLE 2

To 200 g of a 2 wt. % polyacrylamide solution (same polymer as in Example 1), 3.4 g of a 37 wt. % formaldehyde and 4.8 g of a 40 wt. % dimethylamine are added (treatment degree 0.75). The mixture is allowed to react for 5 hours at 40° C. The cation exchange capacity of the solution is measured. The result is 0.18 meq/g at a pH of 4 and 0.10 meq/g at a pH of 7.

3.4 g of a 37 wt. % formaldehyde and 4.8 g of a 40 wt. % dimethylamine are mixed together. After 24 hours this mixture is added to 200 g of a 2 wt. % polyacrylamide solution (same polymer as in Example 1). The mixture is allowed to react for 5 hours at 40° C. The cation exchange capacity of the solution is measured. The result obtained is 0.18 meq/g at a pH of 4 and 0.07 meq/g at a pH of 7.

3.4 g of a 37 wt. % formaldehyde and 4.8 g of a 40 wt. % dimethylamine are mixed together. After 3 weeks this mixture is added to 200 g of a 2 wt. % polyacrylamide solution (same polymer as in Example 1). The mixture is allowed to react for 5 hours at 40° C. The cation exchange capacity of the solution is measured. The result obtained is 0.14 meq/g at a pH of 4 and 0.05 meq/g at a pH of 7.

The effects of the pH and methanol content of the mixture are illustrated in the following example.

EXAMPLE 3

Reaction products according to Table 3 are prepared:

TABLE 3

|  | DMA g | PFA g | HCl g | HCOOH g | MeOH g | Storage pH | Dosage g | Degree of treatment |
|---|---|---|---|---|---|---|---|---|
| Reaction product D | 84.5 | 22.5 | 75.2 |  |  | 6 | 1.8 | 0.75 |
| Reaction product E | 84.5 | 22.5 | 72.2 |  |  | 7 | 1.8 | 0.75 |
| Reaction product F | 84.5 | 22.5 | 77.2 |  |  | 5 | 1.8 | 0.75 |
| Reaction product G | 84.5 | 22.5 | 72.2 |  | 12.6 | 7 | 1.9 | 0.75 |
| Reaction product H | 84.5 | 22.5 | 72.2 |  | 1.6 | 7 | 1.8 | 0.75 |
| Reaction product I | 84.5 | 22.5 |  | 29.3 | 9.5 | 7 | 1.5 | 0.75 |

DMA = 40 wt. % dimethylamine
PFA = paraformaldehyde, J. T. Baker (Laboratory Grade)
HCl = 32 wt. % hydrochloric acid
HCOOH = formic acid
MeOH = methanol Mannich treatments are performed using reaction products D–I so that the reaction products are added in the amounts indicated in Table 3 to 142 g of a 0.5 wt. % polyacrylamide solution (molecular weight approx. 6,500,000). The pH of the solution is adjusted to 10 by using a 10 wt. % sodium carbonate solution. The mixture is allowed to react for 5 hours at 40° C.

Mannich treatments are performed at different times. The cation exchange capacities of the solutions are measured.

The results shown in Table 4 are obtained:

TABLE 4

(Values indicate cation exchange capacity, meq/g)

| Reaction product: | D | E | F | G | H | I |
|---|---|---|---|---|---|---|
| Measurement pH Storage time of reaction product d | pH 4 | pH 4 | pH 4 | pH 4 | pH 4 | pH 4 |
| 1 | 0.023 | 0.023 | 0.023 | 0.024 | 0.023 | 0.022 |
| 7 | 0.021 | 0.020 | 0.020 | 0.020 | 0.020 | 0.010 |
| 14 | 0.020 | 0.021 | 0.020 | 0.020 | 0.019 | 0.007 |
| 56 | 0.022 | 0.017 | 0.018 | 0.016 | 0.017 | 0.001 |
| Measurement pH Storage time of reaction product d | pH 7 | pH 7 | pH 7 | pH 7 | pH 7 | pH 7 |
| 1 | 0.021 | 0.021 | 0.021 | 0.021 | 0.021 | 0.021 |
| 7 | 0.017 | 0.018 | 0.018 | 0.018 | 0.018 | 0.009 |
| 14 | 0.017 | 0.017 | 0.018 | 0.018 | 0.018 | 0.006 |
| 56 | 0.015 | 0.014 | 0.015 | 0.014 | 0.014 | 0.002 |

The example shows that hydrochloric acid is a better acid for pH adjustment than formic acid. The lowering of the pH from 7 to 5 does not improve stability. Methanol improves stability somewhat when it is used together with the lowering of the pH.

EXAMPLE 4

11.9 g of paraformaldehyde (containing 84 wt. % formaldehyde) and 35.7 g of a 40 wt. % dimethylamine are mixed together. This is called reaction product J. The lowering of its activity is observed as a function of time.

At each point of time, 3.2 g of reaction product J (degree of treatment 1.00) is added to 200 g of a 1 wt. % polyacrylamide solution (same polymer as in Example 1). The mixture is allowed to react for 5 hours at 40° C.

The cation exchange capacity of the solution is measured. The results shown in Table 5 are obtained:

TABLE 5

| Storage time of reaction product d | Cation exchange capacity at pH 4, meq/g | Cation exchange capacity at pH 7, meq/g |
|---|---|---|
| 0 | 0.13 | 0.07 |
| 2 | 0.09 | 0.04 |
| 4 | 0.07 | 0.05 |

TABLE 5-continued

| Storage time of reaction product d | Cation exchange capacity at pH 4, meq/g | Cation exchange capacity at pH 7, meq/g |
|---|---|---|
| 7 | 0.06 | 0.05 |
| 14 | 0.04 | 0.03 |

The examples show that if the dimethylamine solution and the formaldehyde solution are mixed together before the reaction with polyacrylamide, the reaction capacity of the reaction product is lowered in three weeks so that the cation capacity of a 2 wt. % polyacrylamide solution with a treatment degree of 0.75 drops from 0.18 meq/g to 0.15 meq/g at a pH of 4 and from 0.10 meq/g to 0.05 meq/g at a pH of 7.

When paraformaldehyde is used instead of a formaldehyde solution, the reaction capacity of the reaction product is lowered in two weeks so that the cation exchange capacity of a 1 wt. % polyacrylamide solution with a treatment degree of 1.00 drops from 0.13 meq/g to 0.04 meq/g at a pH of 4 and from 0.07 meq/g to 0.03 meq/g at a pH of 7. The more rapid lowering of the reaction capacity is due to the fact that, when paraformaldehyde is used, methanol used for the stabilization of a formaldehyde solution does not end up in the reaction product.

The significance of the storage pH of the adduct is examined in greater detail in the following example.

EXAMPLE 5

Reaction products according to Table 6 are prepared. They are called reaction products K–O.

TABLE 6

| Reaction product | K | L | M | N | O |
|---|---|---|---|---|---|
| DMA, g | 100.0 | 100.0 | 100.0 | 100.0 | 100.0 |
| CH$_2$O, g | 72.0 | 72.0 | 72.0 | 72.0 | 72.0 |
| HCl, g | 12.6 | 50.6 | 91.8 | 100.8 | 101.1 |
| Storage pH | pH 9 | pH 8 | pH 7 | pH 6 | pH 5 |
| Dose, g | 1.6 | 1.9 | 2.2 | 2.3 | 2.3 |
| Treatment degree | 0.75 | 0.75 | 0.75 | 0.75 | 0.75 |

DMA = 40 wt. % dimethylamine
CH$_2$O = 37 wt. % formaldehyde
HCl = 32 wt. % hydrochloric acid Mannich treatments are performed using reaction products K–O after 4 weeks of storage of the reaction product so that the reaction products are added in the amounts shown in Table 6 to 142 g of a 0.5 wt. % polyacrylamide solution (molecular weight approx. 6,500,000). The pH of the solution is adjusted to 10 by using a 10 wt. % sodium carbonate solution. The mixture is allowed to react for 5 hours at 40° C.

The cation exchange capacities of the solutions are measured. The results shown in Table 7 are obtained.

TABLE 7

| Reaction product | K | L | M | N | O |
|---|---|---|---|---|---|
| Storage pH | pH 9 | pH 8 | pH 7 | pH 6 | pH 5 |
| Cation exchange capacity at pH 4, meq/g | 0.016 | 0.014 | 0.022 | 0.024 | 0.024 |

TABLE 7-continued

| Reaction product | K | L | M | N | O |
|---|---|---|---|---|---|
| Cation exchange capacity at pH 7, meq/g | 0.013 | 0.012 | 0.020 | 0.022 | 0.022 |

The results show that the stability of the adduct is at its best when the storage pH of the adduct is 7 or lower.

In the following example, the ratio of formaldehyde to dimethylamine is examined from the viewpoint of stability.

EXAMPLE 6

Reaction products according to Table 8 are prepared. They are called reaction products P–T.

TABLE 8

| Reaction product | P | Q | R | S | T |
|---|---|---|---|---|---|
| CH$_2$O/DMA mol/mol | 1.2 | 1.1 | 1.0 | 0.9 | 0.8 |
| DMA, g | 100.0 | 100.0 | 100.0 | 100.0 | 100.0 |
| CH$_2$O, g | 86.4 | 79.2 | 72.0 | 64.8 | 57.6 |
| HCl, g | 94.0 | 93.1 | 91.8 | 93.2 | 94.2 |
| Storage pH | pH 7 | pH 7 | pH 7 | pH 7 | pH 7 |
| Dose, g | 2.0 | 2.1 | 2.2 | 2.4 | 2.7 |
| Treatment degree | 0.75 | 0.75 | 0.75 | 0.75 | 0.75 |

DMA = 40 wt. % dimethylamine
CH$_2$O = 37 wt. % formaldehyde
HCl = 32 wt. % hydrochloric acid Mannich treatments are performed using reaction products P–T after 4 weeks of storage of the reaction products so that the reaction products are added in the amounts shown in Table 8 to 142 g of a 0.5 wt. % polyacrylamide solution (molecular weight approx. 6,500,000). The pH of the solution is adjusted to 10 by using a 10 wt. % sodium carbonate solution. The mixture is allowed to react for 5 hours at 40° C.

The cation exchange capacities of the solutions are measured. The results shown in Table 9 are obtained.

TABLE 9

| Reaction product | P | Q | R | S | T |
|---|---|---|---|---|---|
| CH$_2$O/DMA mol/mol | 1.2 | 1.1 | 1.0 | 0.9 | 0.8 |
| Cation exchange capacity at pH 4, meq/g | 0.021 | 0.021 | 0.022 | 0.024 | 0.023 |
| Cation exchange capacity at pH 7, meq/g | 0.019 | 0.019 | 0.020 | 0.021 | 0.020 |

The results show that the stability of the adduct is at its best when a small excess of amine has been used in the preparation of the adduct.

In the following example, the significance of different acids is examined.

EXAMPLE 7

Reaction products according to Table 10 are prepared. They are called reaction products U–W.

TABLE 10

| Reaction product | U | V | W |
|---|---|---|---|
| DMA, g | 100.0 | 100.0 | 100.0 |
| CH$_2$O, g | 72.0 | 72.0 | 72.0 |
| HCl, g | | | 91.8 |

TABLE 10-continued

| Reaction product | U | V | W |
|---|---|---|---|
| $H_2SO_4$, g | 42.4 | | |
| $C_2H_2O_4 \cdot 2H_2O$ | | 53.7 | |
| Storage pH | pH 7 | pH 7 | pH 7 |
| Dose, g | 1.8 | 1.9 | 2.2 |
| Treatment degree | 0.75 | 0.75 | 0.75 |

DMA = 40 wt. % dimethylamine
$CH_2O$ = 37 wt. % formaldehyde
HCl = 32 wt. % hydrochloric acid
$H_2SO_4$ = strong sulfuric acid
$C_2H_2O_4 \cdot 2H_2O$ = oxalic acid dihydrate Mannich treatments are performed using reaction products U–W after 4 weeks of storage of the reaction products so that the reaction products are added in the amounts shown in Table 10 to 142 g of a 0.5 wt. % polyacrylamide solution (molecular weight approx. 6,500,000). The pH of the solution is adjusted to 10 by using a 10 wt. % sodium carbonate solution. The mixture is allowed to react for 5 hours at 40° C.

The cation exchange capacities of the solutions are measured. The results shown in Table 11 are obtained.

TABLE 11

| Reaction product | U | V | W |
|---|---|---|---|
| Cation exchange capacity at pH 4, meq/g | 0.024 | 0.025 | 0.022 |
| Cation exchange capacity at pH 7, meq/g | 0.019 | 0.019 | 0.020 |

The results show that even other acids in addition to hydrochloric acid function in the stabilization of the adduct.

In the following example the significance of the pH of the reaction solution is illustrated.

EXAMPLE 8

81.2 g of a 37 wt. % formaldehyde solution and 118.3 g of a 40 wt. % dimethylamine are mixed together. The mixture is allowed to react for 2 hours at 45° C., whereafter the mixture is cooled and its pH is lowered to 6.5 by using a 32 wt. % hydrochloric acid (122.5 g).

Mannich treatments are performed using the reaction product, at different pH values, by adding 2.3 g of the reaction product to 142 g of a 0.5 wt. % polyacrylamide solution (molecular weight approx. 6,500,000). The pH values of the solutions are adjusted to the values shown in Table 12 by using a 10 wt. % sodium carbonate solution. The mixture is allowed to react for 5 hours at 40° C.

TABLE 12

| pH of reaction solution | 10 wt. % sodium carbonate solution, g | Charge at pH 4, meq/g | Charge at pH 7, meq/g |
|---|---|---|---|
| 7.4 | 0 | 0.007 | −0.0004 |
| 8 | 0.43 | 0.007 | 0.004 |
| 9 | 2.95 | 0.017 | 0.014 |
| 9.5 | 5.85 | 0.024 | 0.014 |
| 10 | 12.29 | 0.025 | 0.022 |

The charges of the solution are measured. The results shown in Table 12 are obtained. It is seen that the reaction progresses more rapidly at high pH values.

EXAMPLE 9

Mannich treatments are performed by adding the amounts shown in Table 13 of dimethylamine and formaldehyde to 200 g of a 1 wt. % polyacrylamide solution (polymer viscosity in 2 wt. % solution 700 mPas 25° C. Brookfield, spindle No. 31, 12 rpm). The pH of the solution is adjusted to the values shown in the table, first by using a 32 wt. % hydrochloric acid and finally by using a 3.2 wt. % hydrochloric acid. The mixture is allowed to react for 5 hours at 40° C. The cation exchange capacities of the solutions are measured at pH values of 4 and 7.

TABLE 13

| Reaction conditions: | | | |
|---|---|---|---|
| 40 wt. % dimethylamine, g | 2.50 | 2.50 | 2.38 |
| 37 wt. % formaldehyde, g | 1.71 | 1.88 | 1.71 |
| Treatment degree with respect to dimethylamine | 0.79 | 0.79 | 0.75 |
| Treatment degree with respect to formaldehyde | 0.75 | 0.82 | 0.75 |
| Initial pH of the reaction solution | 4.4 | 3.0 | 3.0 |
| Consumption of 32 wt. % hydrochloric acid, g | 2.0 | 2.1 | 2.2 |
| Consumption of 3.2 wt. % hydrochloric acid, g | 3.5 | 2.3 | 1.4 |
| Product obtained: | | | |
| Cation exchange capacity at pH 4, meq/g | 0.024 | 0.010 | 0.009 |
| Cation exchange capacity at pH 7, meq/g | 0.019 | 0.009 | 0.008 |

A comparison of the results with those presented in Example 1, obtained at a pH of 10, shows that the cation exchange capacities of the solutions remain clearly lower. This shows that the Mannich reaction does not progress nearly as well in acid conditions as in alkaline conditions.

What is claimed is:

1. A process for the preparation of an aqueous solution comprising a cationically modified (meth)acrylamide polymer by the Mannich reaction, the process comprising:

forming a stable aldehyde-secondary amine adduct by reacting an aqueous solution of a secondary amine with an aqueous solution of an aldehyde, stabilizing the adduct by lowering the pH to no more than about 7, and optionally, by adding methanol;

combining the adduct and an aqueous solution of a (meth)acrylamide polymer, and adjusting the pH to greater than 7, thereby modifying the polymer, and providing an aqueous solution comprising a cationic modified (meth)acrylamide polymer.

2. The process of claim 1, wherein the aldehyde is formaldehyde, paraformaldehyde, or 1,3,5-trioxane.

3. The process of claim 1, wherein the secondary amine is dimethylamine.

4. The process of claim 3, wherein the secondary amine is dimethylamine.

5. The process of claim 4, wherein methanol is added to stabilize the adduct.

6. The process of claim 1, wherein an alkali metal hydroxide or alkali metal carbonate is added to raise the pH to greater than 7.

7. The process of claim 6, wherein the alkali metal carbonate is selected from the group consisting of sodium hydroxide, sodium carbonate, potassium hydroxide, and potassium carbonate.

8. The process of claim 7, wherein the pH is adjusted to greater than about 9.

9. The process of claim 1, wherein an alkali is added to adjust the pH to greater than 7 simultaneous with combining the adduct with the polymer.

10. The process of claim 9, wherein an alkali metal hydroxide or alkali metal carbonate is added to raise the pH to greater than 7.

11. The process of claim 10, wherein the alkali metal hydroxide or alkali metal carbonate is sodium hydroxide, sodium carbonate, potassium hydroxide, or potassium carbonate.

12. The process of claim 11, wherein the pH is adjusted to greater than about 9.

13. The process of claim 1, wherein an alkali is added after combining the adduct with the polymer.

14. The process of claim 13, wherein an alkali metal hydroxide or alkali metal carbonate is added to raise the pH to greater than 7.

15. The process of claim 14, wherein the alkali metal hydroxide or alkali metal carbonate is sodium hydroxide, sodium carbonate, potassium hydroxide, or potassium carbonate.

16. The process of claim 14, wherein the pH is adjusted to greater than about 9.

* * * * *